United States Patent
Geerts

(10) Patent No.: US 8,098,167 B2
(45) Date of Patent: Jan. 17, 2012

(54) VEHICLE FOR DETERMINING THE CLIMATE

(75) Inventor: Franciscus Theodorus Cornelis Geerts, Moergestel (NL)

(73) Assignee: Lely Enterprises AG, Zug (CH)

( * ) Notice: Subject to any disclaimer, the term of this patent is extended or adjusted under 35 U.S.C. 154(b) by 0 days.

(21) Appl. No.: 09/767,496

(22) Filed: Jan. 24, 2001

(65) Prior Publication Data

US 2001/0013828 A1    Aug. 16, 2001

Related U.S. Application Data

(63) Continuation of application No. PCT/NL00/00309, filed on May 10, 2000.

(30) Foreign Application Priority Data

May 25, 1999   (NL) ..................................... 1012138

(51) Int. Cl.
    *G08B 23/00*   (2006.01)
(52) U.S. Cl. ...................... 340/693.5; 340/601; 340/584; 340/632; 340/540
(58) Field of Classification Search .................. 340/601, 340/573.1, 541, 693.5, 600, 584, 632, 540, 340/500; 119/51.02, 174, 908, 60, 14.1, 119/14.02, 14.11
    See application file for complete search history.

(56) References Cited

U.S. PATENT DOCUMENTS

| | | | | |
|---|---|---|---|---|
| 4,218,755 A | * | 8/1980 | Root | 364/900 |
| 4,227,645 A | | 10/1980 | De La Farge | |
| 4,968,878 A | * | 11/1990 | Pong | 250/221 |
| 4,977,509 A | * | 12/1990 | Pitchford | 364/449 |
| 5,008,821 A | * | 4/1991 | Pratt et al. | 364/413.01 |
| 5,178,010 A | * | 1/1993 | Holzel | 73/384 |
| 5,474,085 A | * | 12/1995 | Hurnik | 128/774 |
| 5,978,738 A | * | 11/1999 | Brown | 702/3 |
| 6,312,507 B1 | * | 11/2001 | Taylor | 96/19 |

FOREIGN PATENT DOCUMENTS

| | | |
|---|---|---|
| FR | 2586223 A1 | 2/1987 |
| FR | 2710767 A1 | 4/1995 |
| JP | 61110678 A | 5/1986 |
| JP | 03289310 A | 12/1991 |
| WO | 9614735 A1 | 5/1996 |
| WO | 9731524 A1 | 9/1997 |

OTHER PUBLICATIONS

International Search Report for PCT/NL00/00309 (issued Aug. 4, 2000).
NL Search Report for NL 1012138 (issued Jan. 11, 2000).

* cited by examiner

*Primary Examiner* — Anh V La
(74) *Attorney, Agent, or Firm* — Coraline J. Haitjema; David P. Owen; Hoyng Monegier LLP

(57) ABSTRACT

An unmanned vehicle for use in a stable such as a cowshed is provided with detection components for determining meteorological conditions. The detection components comprise sensors for determining temperature, air velocity, gas, analysis, light, air pressure, and air humidity. The detection sensors are disposed at different heights on the vehicle and on a telescopic carrier for providing determinations at variable altitudes. The vehicle includes a data processing unit for storing and analyzing data. The vehicle also includes a transmitting unit and signaling device for transfer of data and for alerting an operator of threatening meteorological conditions and when they become hostile. Composition and quantity of feed which is provided to animals in the stable is varied dependent on changes in climate detected by the vehicle.

28 Claims, 1 Drawing Sheet

VEHICLE FOR DETERMINING THE CLIMATE

RELATED APPLICATION

The application is a continuation of International Application No. PCT/NL00/00309, filed May 10, 2000.

FIELD OF THE INVENTION

The invention relates to an unmanned vehicle which is adapted to be used in a stable, such as a cowshed.

BACKGROUND OF THE INVENTION

Known unmanned vehicles are usually employed for cleaning the stable floor.

SUMMARY OF THE INVENTION

It is an objective of the invention to provide a multifunctional, unmanned vehicle.

According to the invention, this is achieved by providing an unmanned vehicle with detection means for determining the climate in a stable. In this manner it is also possible to determine, in the absence of operators, whether the climate changes in the stable.

In accordance with an inventive feature, the detection means comprises a temperature sensor or an air velocity sensor or a gas sensor or an air humidity sensor or a light intensity sensor or an air pressure sensor or any combination of these sensors.

For the purposes of determining the climate in a stable very accurately, detection sensors are disposed on the vehicle so as to be able to determine different altitudes in the stable. This is accomplished by the detection means being placed at different heights on the vehicle or on a carrier which is adjustable in height relative to the vehicle. According to another inventive feature, the unmanned vehicle has a data processing unit for storing data from the sensors. According to yet another aspect of the invention, the signals emitted by the sensors are registered or processed, or both, by means of a processing unit or a control unit, or both. When the climate in the stable reaches a predetermined hostile or threatening state, a signal means activates an alarm thereby informing a supervisor. According to another inventive feature, the unmanned vehicle comprises a transmitter unit. Data from the sensors or the control signals, or both, are transmitted to a registration or control unit, or both, with the aid of said transmitter unit.

In accordance with another aspect of the invention, the unmanned vehicle comprises a navigation means for directing the unmanned vehicle through the stable.

According to yet another inventive feature, the unmanned vehicle comprises an animal identification system or a camera device or a radar device, or a combination of said system and devices. This makes it possible to observe the behavior of the animals and to inform a supervisor with the aid of said signal means. It is also possible to identify a specific animal's behavior.

According to a further inventive feature, data collected by the unmanned vehicle are stored in a data management system.

In accordance with another inventive feature, the quantities of feed or the composition of the feed, or both, to be supplied to the animals is altered when the climate in the stable changes.

According to again another inventive feature, the quantity of feed supplied to the animals is increased when the temperature in the stable falls below approximately 4° C.

BRIEF DESCRIPTION OF THE DRAWINGS

The invention will now be explained in further detail with reference to the accompanying drawings.

DETAILED DESCRIPTION OF THE PREFERRED EMBODIMENTS

Figure 1:
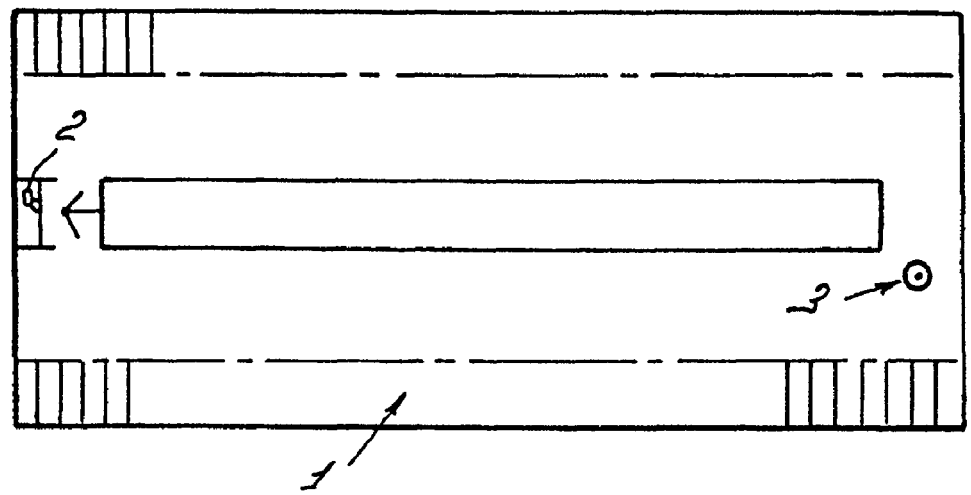
FIG. 1 is a plan view of a stable with an unmanned vehicle accommodated therein, which vehicle is provided with detection means according to the invention.
Figure 2:
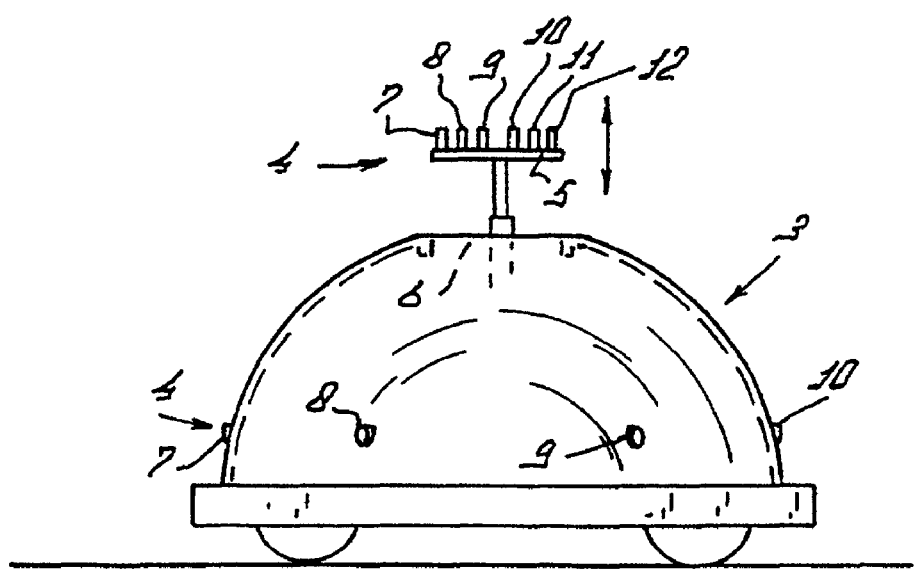
FIG. 2 is a side elevational view of the unmanned vehicle shown in FIG. 1.

FIG. 1 is a plan view of a stable 1 provided with a milking robot 2 for automatically milking animals and an unmanned vehicle 3 which is provided with detection means 4 for determining the climate in stable 1. As shown in FIG. 2, a part of detection means 4 is disposed on a carrier 5 which is mounted on a telescopic carrier. When telescopic carrier 5 is completely closed, the platform on which detection means 4 is disposed will be located in a recess 6 in unmanned vehicle 3. Near the lower side of unmanned vehicle 3 there are also disposed detection means 4. Detection means 4 depicted in FIG. 2 comprises a temperature sensor 7, an air velocity sensor 8, a gas sensor 9, an air humidity sensor 10, a light intensity sensor 11 and an air pressure sensor 12.

Although I have disclosed the preferred embodiments of my invention, it is to be understood that it is capable of other adaptations and modifications within the scope of the following claims:

1. An unmanned mobile vehicle movable within a stable for measuring meteorological conditions within the stable, comprising:
    a vehicle body;
    at least two sensors positioned on said vehicle body and selected from a group consisting of a temperature sensor, an air velocity sensor, a gas sensor, an ammonia sensor, a light sensor, an air pressure sensor, and an air humidity sensor; and
    further comprising a carrier positioned on the vehicle body and wherein the two sensors are disposed on said carrier and at least one of said two sensors is adjustable in height relative to the vehicle body.

2. A vehicle in accordance with claim 1, wherein said one of said sensors is a gas sensor which senses ammonia.

3. A vehicle in accordance with claim 1, wherein said light sensor determines the intensity of light.

4. A vehicle in accordance with claim 1, wherein one of said sensors is an air pressure sensor.

5. A vehicle in accordance with claim 1, wherein at least one of said sensors is an air humidity sensor.

6. A vehicle in accordance with claim 1, wherein said two sensors comprise an air pressure sensor and an air humidity sensor.

7. A vehicle in accordance with claim 1, wherein at least two of said sensors are disposed at different levels on the carrier, which is positioned on the vehicle body.

8. A vehicle in accordance with claim 1, further comprising a data processing unit for storing data from at least two of said sensors.

9. A vehicle in accordance with claim 1, further comprising a processing unit for processing data from at least two of said sensors.

10. A vehicle in accordance with claim 1, further comprising a control unit for controlling data from at least two of said sensors.

11. A vehicle in accordance with claim 1, further comprising a memory for registering data from at least two of said sensors.

12. A vehicle in accordance with claim 1, further comprising alarm means for providing an alarm signal when the climate in said stable reaches a predetermined uncontrollable state.

13. A vehicle in accordance with claim 1, comprising a transmitter unit, said transmitter unit transmitting data from at least two of said sensors to a registration unit.

14. A vehicle in accordance with claim 1, further comprising a transmitter unit that transmits control signals derived from the data of at least two of said sensors to a registration unit.

15. A vehicle in accordance with claim 1, further comprising a transmitter unit that transmits data from at least two of said sensors to a control unit.

16. A vehicle in accordance with claim 1, further comprising a transmitter unit that transmits signals derived from data from at least two of said sensors to a control unit.

17. A vehicle in accordance with claim 1, further comprising navigation means for guiding the vehicle body.

18. A vehicle in accordance with claim 1, further comprising an animal identification system.

19. A vehicle in accordance with claim 1, further comprising a camera positioned on the vehicle body.

20. A vehicle in accordance with claim 1, further comprising a radar positioned on the vehicle body.

21. A vehicle in accordance with claim 1, further comprising a data management system, at least two of said sensors collecting data which are stored in said data management system.

22. A vehicle in accordance with claim 1, further comprising feed modification means.

23. A vehicle in accordance with claim 22, wherein said feed modification means modifies the quantity of feed supplied to animals in said stable when the climate in said stable changes.

24. A vehicle in accordance with claim 22, wherein said feed modification means modifies the composition of feed supplied to animals in said stable when the climate in said stable changes.

25. A vehicle in accordance with claim 23, wherein said feed modification means increases the quantity of feed which is supplied to animals in said stable when the temperature in said stable falls below approximately 4° C.

26. An unmanned mobile vehicle movable within a stable for measuring meteorological conditions within the stable, comprising:
   a vehicle body;
   a carrier mounted on said vehicle body;
   a temperature sensor, an air velocity sensor, and an air humidity sensor, said sensors mounted on said carrier; and
   means for adjusting a height of at least one of said sensors relative to the vehicle body.

27. An unmanned mobile vehicle for use in a process of maintaining the health and comfort of animals in a stable and movable along a floor of the stable to measure meteorological conditions within the stable, comprising:
   a vehicle body; and
   two sets of sensors positioned on said vehicle body, each set of said sensors including a temperature sensor and a humidity sensor, one of said sets being mounted on an elevating means of said vehicle body whereby said one set of sensors is adapted to be elevated to different selected heights in the stable relative to the floor of the stable.

28. An unmanned mobile vehicle in accordance with claim 27, wherein said one set of sensors further comprises a light intensity sensor and an air pressure sensor.

* * * * *